United States Patent [19]

Grossmann

[11] Patent Number: 4,890,885

[45] Date of Patent: Jan. 2, 1990

[54] SEAT FOR A VEHICLE, AIRCRAFT OR THE LIKE

[75] Inventor: Kay Grossmann, Flacht, Fed. Rep. of Germany

[73] Assignee: Dr. Ing. H.c.F. Porsche AG, Weissach, Fed. Rep. of Germany

[21] Appl. No.: 275,370

[22] Filed: Dec. 23, 1988

[30] Foreign Application Priority Data

Nov. 24, 1987 [DE] Fed. Rep. of Germany ....... 3739752

[51] Int. Cl.⁴ .............................. A47C 4/54; A47C 3/00
[52] U.S. Cl. ..................................... 297/284; 264/222; 297/DIG. 1; 297/DIG. 3; 297/460
[58] Field of Search ......... 264/222; 297/284, DIG. 3, 297/DIG. 1, 391, 460; 5/453, 455, 449

[56] References Cited

U.S. PATENT DOCUMENTS

| 4,347,213 | 8/1982 | Rogers, Jr. | 264/222 |
| 4,622,185 | 11/1986 | Kostich | 264/222 X |
| 4,744,601 | 5/1988 | Nakanishi | 297/DIG. 5 |

FOREIGN PATENT DOCUMENTS

| 0094281 | 11/1983 | European Pat. Off. | 297/DIG. 3 |
| 2622556 | 12/1977 | Fed. Rep. of Germany . | |
| 3205859 | 10/1982 | Fed. Rep. of Germany . | |
| 3320847 | 7/1984 | Fed. Rep. of Germany. | 297/DIG. 3 |

Primary Examiner—James T. McCall
Attorney, Agent, or Firm—Barnes & Thornburg

[57] ABSTRACT

A seat for a vehicle, aircraft or the like includes a seat part and a backrest whereby the backrest is provided with an integrated headrest. In order that, on the one hand, the area of the cervical spinal column-lordosis of the respective seat user is effectively supported during the driving operation and, on the other, injuries of the cervical spinal column are at least reduced in case of an impact, a continuously changeable vacuum cushion is arranged at the backrest within the area of the headrest which is adapted to be individually matched to the cervical vertebrae column-lordosis of the respective seat user by means of an extraction pump and at least one valve.

12 Claims, 5 Drawing Sheets

SEAT FOR A VEHICLE, AIRCRAFT OR THE LIKE

BACKGROUND AND SUMMARY OF THE INVENTION

The present invention relates to a seat for a vehicle, aircraft or the like which includes a seat part and a backrest, whereby the backrest is provided with an integrated headrest.

A seat of the aforementioned type is known from the DE-OS No. 26 22 556. The backrest is thereby drawn up so far that its upper end area forms an integrated headrest. No measures are taken in connection with this seat to effectively support the lumbar spinal column-lordosis and the cervical spinal column-lordosis of the seat user during the driving operation.

A seat for a motor vehicle is disclosed in the DE-OS No. 32 05 859 which includes a support system for the lumbar area of a person seated on the vehicle seat. In this arrangement, exclusively the area of the lumbar vertebrae spinal column-lordosis of the seat passenger is supported by an air cushion which is integrated into the backrest. Measures for the support of the cervical vertebrae spinal column-lordosis of the respective seat user, however, are also not provided in this arrangement.

It is the object of the present invention to undertake such measures at a seat having a headrest integrated into the backrest that the area of the cervical vertebrae column-lordosis of the respective seat passenger is effectively supported during the driving operation and that, on the other, injuries of the cervical vertebrae column are at least reduced during an impact (from in front, the rear or laterally).

The underlying problems are solved according to the present invention in that a steplessly or continuously changeable vacuum cushion is arranged at the backrest within the area of the headrest which is adapted to be individually adapted by means of an extraction pump and at least one valve to the physiological cervical spinal column-lordosis of the respective seat user.

The advantages principally achieved with the present invention reside in that by the arrangement of a continuously changeable vacuum cushion at the backrest, and more particularly within the area of the headrest, an effective support of the cervical spinal column-lordosis of the respective seat passenger is achieved. Also in longer drives, no fatigue effect of the neck muscles occurs as a result of this support. Additionally, stresses of the neck-, of the neck nape-, of the shoulder- and of the arm-muscles are far-reachingly avoided. Therebeyond, in case of an impact, the bending, respectively, stretching as well as the lateral axial displacement of the cervical spinal column is minimized. An individual headrest adapted to be modelled to the requirements of the user is created by the changeable vacuum cushion so that for different seat passengers an optimized adjustment can be found in each case. In case of a crash, the head is more softly supported by the small plastic parts arranged in the vacuum cushion and injuries or strains of the cervical spinal column is prophylactically precluded.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
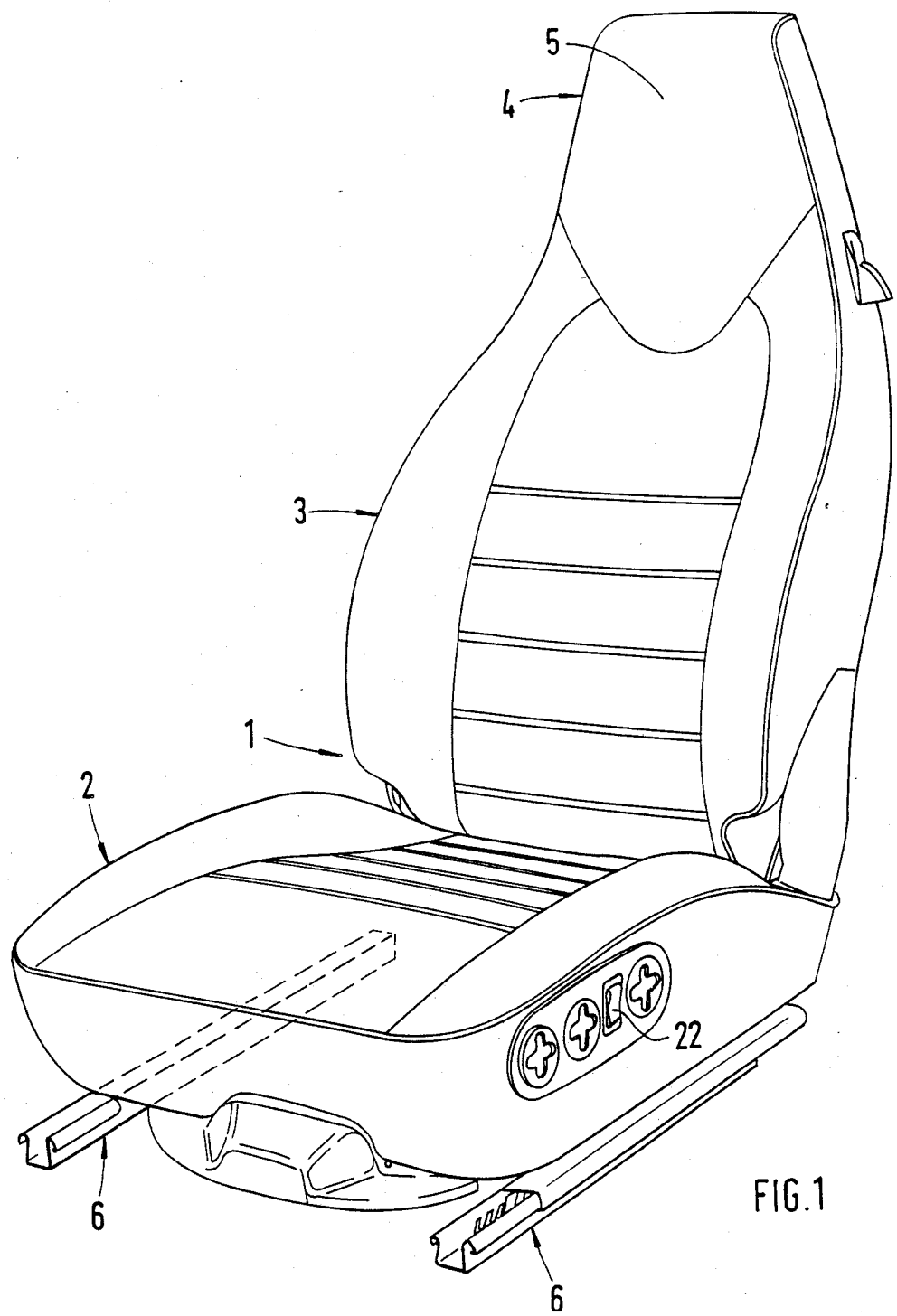
FIG. 1 is a perspective view on a seat for a vehicle, aircraft or the like in accordance with the present invention.

Referring now to the drawing wherein like reference numerals are used throughout the various views to designate like parts, the seat generally designated by reference numeral 1 for a vehicle, aircraft or the like which is illustrated in FIG. 1, includes a seat part 2 which is connected by way of adjusting fittings (not shown) with a backrest 3 adapted to be adjusted in its inclination. An upper end area 4 of the backrest 3 is constructed as fixed integrated headrest 5. The seat part 2 is displaceably supported at the adjoining body (not shown) by means of guide rails 6 extending in the vehicle longitudinal direction.

Figure 2:
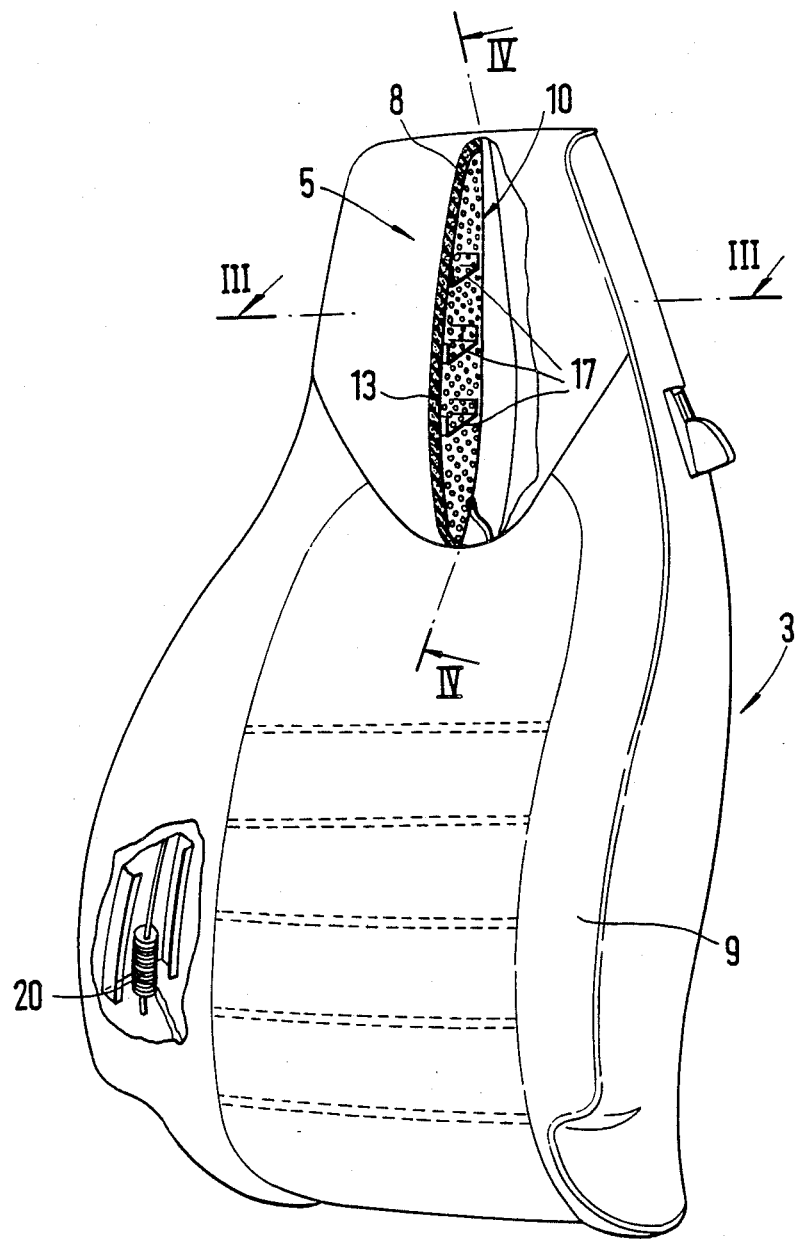
FIG. 2 is a perspective view, partly in cross section, on the backrest of the seat with the vacuum cushion in accordance with the present invention.
Figure 3:
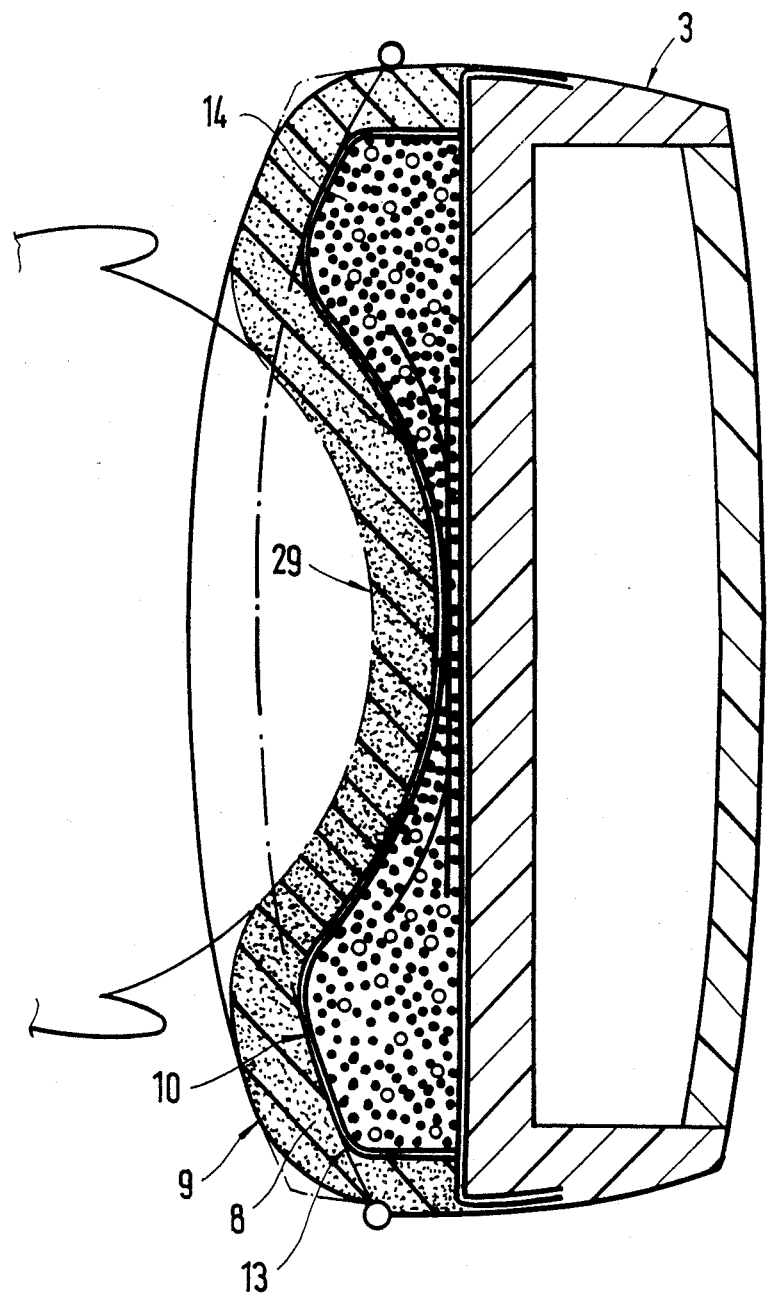
FIG. 3 is a cross-sectional view, on an enlarged scale, taken along line III—III of FIG. 2.

The backrest 3 essentially consists of a backrest frame 7 (FIG. 3), of a foam-material layer 8 and of a decorative seat cover 9 (FIG. 2). Additionally, a vacuum cushion 10 (FIGS. 2-4) continuously changeable within certain limits is provided at the backrest 3 within the area of the headrest 5, which serves for the support of the cervical vertebrae column-lordosis 11 and the head area of seat passengers 12 of different height and body shape.

The vacuum cushion 10 is arranged between the foam material layer 8 and the side of the backrest frame 7 facing the seat passenger 12. According to FIG. 2, the vacuum cushion 10 includes an air non-permeable cover 13 in which a large number of small plastic material parts 14, for example, small polystyrene balls are arranged. The cover 13 composed of two halves 15 and 16 (FIG. 4) is securely connected along the circumference with the backrest frame 7, for example, by gluing or bonding.

For positioning the small plastic material parts 14, several lamellae 17 one arranged above the other are arranged inside of the cover 13, as viewed in the height direction, which are constructed U-shaped as viewed in cross section and are securely connected at their two ends with the inside of the cover 13. The lamellae 17 made of flexible plastic material include a large number of air passage openings 18, whereby the latter have such a size that the small plastic material parts 14 cannot drop down through these openings 18 whereas a throughflow of air is made possible.

Figure 5:
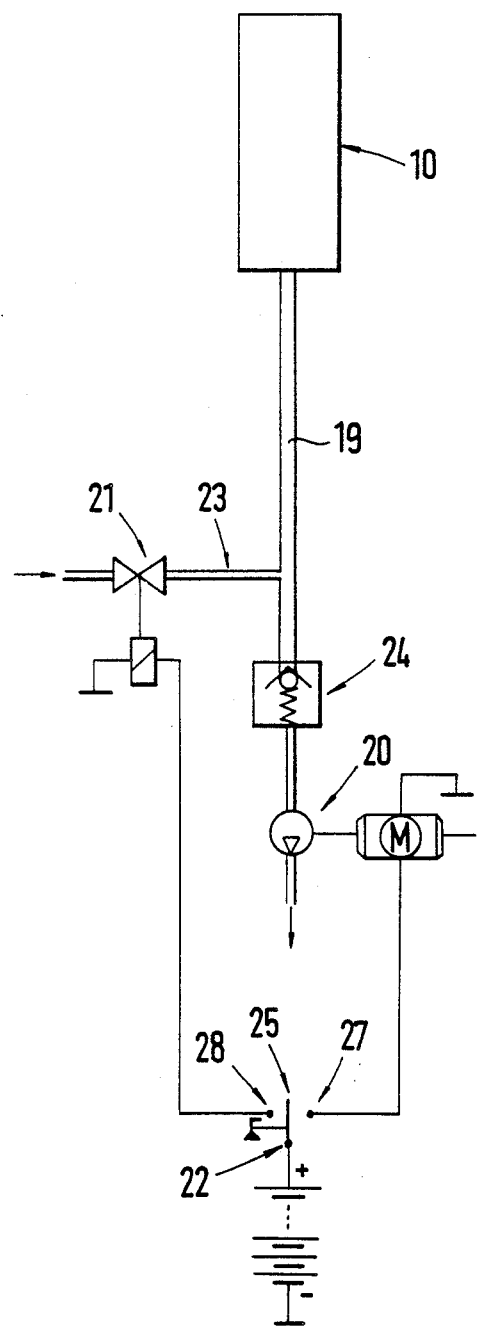
FIG. 5 is a schematic diagram for the control of the variable vacuum cushion in accordance with the present invention.

The cover 13 is connected in the lower area by way of a hose line 19, on the one hand, with an extraction pump 20 and, on the other with a valve 21 whereby the extraction pump 20 and the valve 21 are activatable alternately by a switch, for example, a two-position toggle switch generally designated by reference numeral 22 (FIGS. 1 and 5). The extraction pump 20 is electrically driven in the illustrated embodiment.

The valve 21 which is closed when non-activated, is arranged in a branch line 23 of the hose line 19 and is preferably constructed as electromagnetic or solenoid valve. Additionally, a check valve 24 is arranged in the hose line 19 downstream of the branching point 23 and upstream of the extraction pump 20 which assures that the air can flow through exclusively in the direction toward the extraction pump 20.

FIG. 5 illustrates a schematic diagram for the control of the variable vacuum cushion 10. The switch 22 thereby normally assumes a neutral center position. The valve 21 is closed in the center position of the switch 22 and the extraction pump 20 is turned off.

Figure 4:
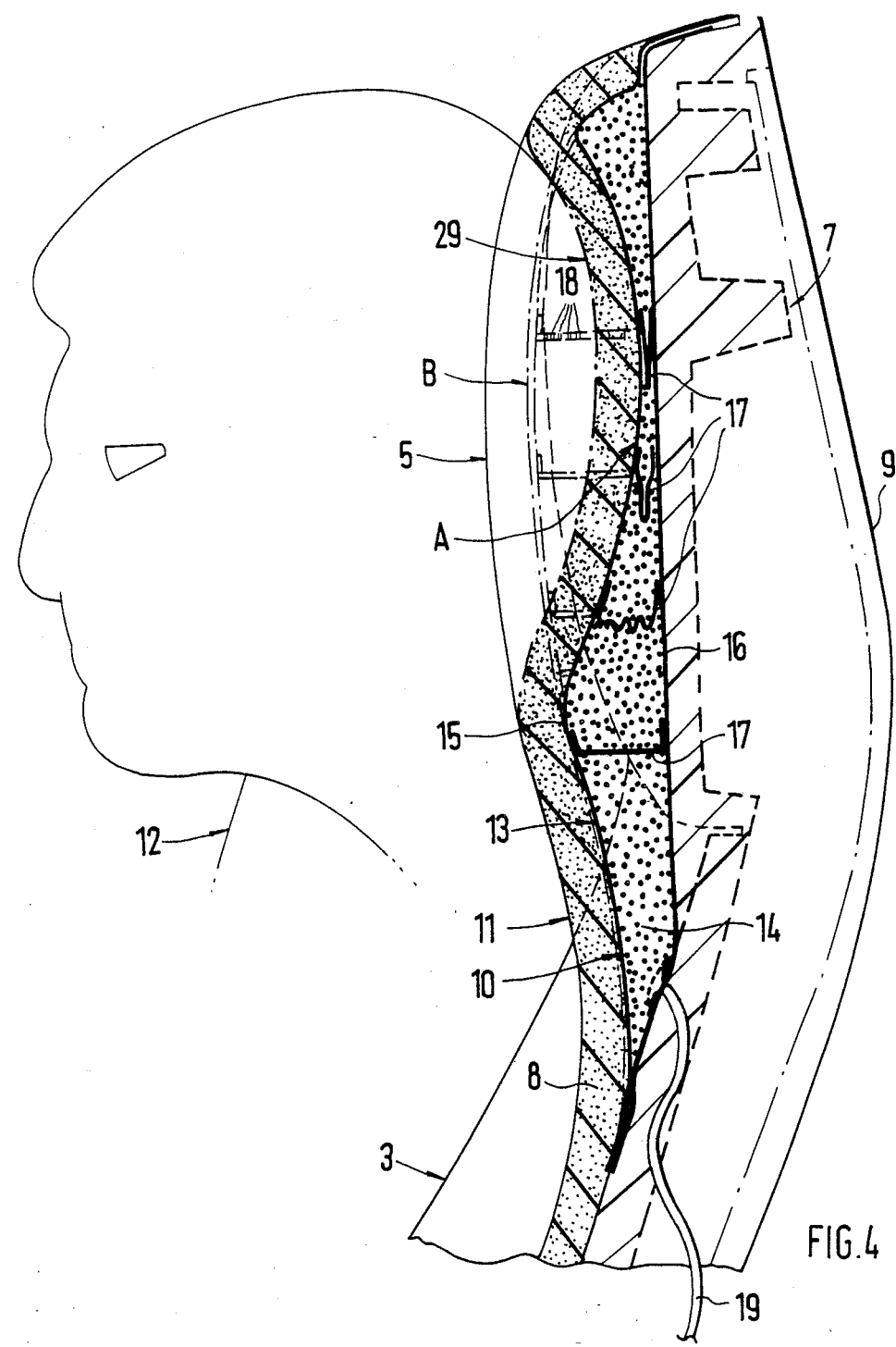
FIG. 4 is a cross-sectional view, on an enlarged scale, taken along IV—IV of FIG. 2.

If air is now to be evacuated out of the vacuum cushion 10, then the switch 22 is actuated in such a manner that the switching member 25 of the switch 22 abuts at the contact 27. As a result thereof, the electric motor of the extraction pump 20 is activated and the air is sucked out of the vacuum cushion 10. As a result of the evacuation of the cushion, the small plastic material parts 14 are condensed to such an extent that the cervical spinal column-lordosis 11 and the rear head area 29 of the seat passenger 12 are effectively supported. This position is shown in FIG. 4 in full lines (position A). The lamellae 17 are thereby deformed in the vehicle longitudinal direction.

For inflating the vacuum cushion 10, the switch 22 is displaced in the other direction so that the switching member 25 abuts at the contact 28. As a result thereof, the valve 21 opens and the air flows out of the atmosphere through the branching section 23 and the hose line 19 into the vacuum cushion 10 until the latter has its desired shape. The fully inflated position of the vacuum cushion 10 is designated in FIG. 4 by reference character B (dash and dotted lines). In the position B, the vacuum cushion is relatively soft whereas in the position A the vacuum cushion 10 is adjusted relatively hard. In the position A, the rear head area 29 of the seat passenger 12 is fixed both in the vertical as also in the vehicle transverse direction. The vacuum cushion 10 can assume selectively the position A, the position B and all positions disposed therebetween.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A seat for a vehicle, aircraft or the like comprising seat means, backrest means including a backrest frame and an integrated headrest means, a continuously changeable vacuum cushion means being arranged at the backrest means within the area of the headrest means, and means including an extraction pump and at least one valve means for individually matching the vacuum cushion means to the physiological cervical spinal column-lordosis of the respective seat user.

2. A seat for a vehicle, aircraft or the like comprising seat means, backrest means including a backrest frame and an integrated headrest means, a continuously changeable vacuum cushion means being arranged at the backrest means within the area of the headrest means, the vacuum cushion means including a cover means of air non-permeable material, and a large number of small plastic material parts arranged inside of the cover means, and means including an extraction pump and at least one valve means for individually matching the vacuum cushion means to the physiological cervical spinal column-lordosis of the respective seat user.

3. A seat according to claim 2, wherein the cover means is secured circumferentially at a backrest frame of the backrest means.

4. A seat according to claim 2, wherein for purposes of positioning the small plastic material parts inside of the cover means—as viewed in vertical direction—several spaced lamellae means disposed one above the other are provided whereby the lamellae means have a large number of air passage openings.

5. A seat according to claim 1, wherein the extraction pump and the valve means are activatable by a switch means which is arranged at the seat.

6. A seat according to claim 1, wherein the extraction pump and the valve means are arranged at a lateral girder of the backrest frame of the backrest means.

7. A seat according to claim 1, wherein the vacuum cushion means is arranged on the side of the backrest frame facing the seat passenger, and a foamed material layer being provided in front of the vacuum cushion means.

8. A seat according to claim 5, wherein the extraction pump and the valve means are arranged at a lateral girder of the backrest frame of the backrest means.

9. A seat according to claim 5, wherein the vacuum cushion means is arranged on the side of the backrest frame facing the seat passenger, and a foamed material layer being provided in front of the vacuum cushion means.

10. A seat according to claim 9, wherein the vacuum cushion means includes a cover means of air non-permeable material, and a large number of small plastic material parts arranged inside of the cover means.

11. A seat according to claim 10, wherein the cover means is secured circumferentially at a backrest frame of the backrest means.

12. A seat according to claim 10, wherein for purposes of positioning the small plastic material parts inside of the cover means—as viewed in vertical direction—several spaced lamellae means disposed one above the other are provided whereby the lamellae means have a large number of air passage openings.

* * * * *